United States Patent [19]

Sanders et al.

[11] 4,406,822

[45] * Sep. 27, 1983

[54] METHOD OF MAKING ZEOLITES

[75] Inventors: Robert N. Sanders, Baton Rouge; Sebastian M. Laurent, Greenwell Springs, both of La.

[73] Assignee: Ethyl Corporation, Richmond, Va.

[*] Notice: The portion of the term of this patent subsequent to Sep. 27, 2000 has been disclaimed.

[21] Appl. No.: 308,356

[22] Filed: Oct. 5, 1981

[51] Int. Cl.$^3$ .................... B01J 29/06; B01J 20/18
[52] U.S. Cl. ...................... 252/455 Z; 423/328; 423/329
[58] Field of Search ............ 252/455 Z; 423/328, 423/329

[56] References Cited

U.S. PATENT DOCUMENTS 3,374,058 3/1968 McDaniel et al. ........... 423/328 X
4,058,586 11/1977 Chi et al. ..................... 252/455 Z
4,151,100 4/1979 Kettinger et al. ............. 423/329
4,166,099 8/1979 McDaniel et al. ............. 423/329
4,235,856 11/1980 Kostinko ...................... 423/329

Primary Examiner—Carl F. Dees
Attorney, Agent, or Firm—Donald L. Johnson; John F. Sieberth; Paul H. Leonard

[57] ABSTRACT

A method of simultaneously producing or co-synthesizing a combination of zeolite X and zeolite A by separately preparing a sodium aluminate solution and a sodium silicate solution, adding the sodium aluminate solution to the sodium silicate solution activated with a relatively small amount of zeolite X seed or bulk product, mixing the solutions together under controlled conditions of temperature and time and heating the mixture to a desired temperature for sufficient time to form a product which is a combination of zeolite X and zeolite A of about 40 percent to 60 percent crystalline with the remainder being an amorphous functional binder.

21 Claims, No Drawings

METHOD OF MAKING ZEOLITES

BACKGROUND OF THE INVENTION

1. Field of the Invention

In general, the present invention relates to the production of zeolites.

2. Description of the Prior Art

Certain naturally occurring hydrated metal aluminum silicates are called zeolites. The synthetic zeolites of the invention have compositions similar to some of the natural zeolites. The most common of these zeolites are sodium zeolites.

Zeolites consist basically of a three-dimensional framework of $SiO_4$ and $AlO_4$ tetrahedra. The tetrahedra are crosslinked by the sharing of oxygen atoms so that the ratio of oxygen atoms to the total of the aluminum and silicon atoms is equal to two or $O/(Al+Si)=2$. The electrovalence of each tetrahedra containing aluminum is balanced by the inclusion in the crystal of a cation, for example, a sodium ion. This balance may be expressed by the formula, $Al/Na=1$. The spaces between the tetrahedra are occupied by water molecules prior to dehydration.

Zeolites may be activated by heating to effect the loss of the water of hydration. The dehydration results in crystals interlaced with channels of molecular dimensions that offer very high surface areas for the adsorption of foreign molecules. The interstitial channels of zeolite X are of a size such that heptacosafluorotributylamine and larger molecules will not enter into the channels. The interstitial channels of zeolite A will not accept molecules larger than 5.5 A.

Zeolites A and X may be distinguished from other zeolites and silicates on the basis of their x-ray powder diffraction patterns and certain physical characteristics. The x-ray patterns for several of these zeolites are described below. The composition and density are among the characteristics which have been found to be important in identifying these zeolites.

The basic formula for all crystalline sodium zeolites may be represented as follows:

$$Na_2O:Al_2O_3:xSiO_2:yH_2O$$

In general, a particular crystalline zeolite will have values for x and y that fall in a definite range. The value x for a particular zeolite will vary somewhat since the aluminum atoms and the silicon atoms occupy essentially equivalent positions in the lattice. Minor variations in the relative numbers of these atoms do not significantly alter the crystal structure or physical properties of the zeolite. For zeolite X, an average value for x is about 2.5 with the x value normally falling within the range $2.5\pm0.5$. For zeolite Z, the x value normally falls within the range $1.85\pm0.5$.

The value of y is not necessarily an invariant for all samples of zeolites. This is true because various exchangeable ions are of different size, and, since there is no major change in the crystal lattice dimensions upon ion exchange, the space available in the pores of the zeolites to accommodate water molecules varies.

The average value for y determined for zeolite X is 6.2. For zeolite A, it is 5.1.

In zeolites synthesized according to the preferred procedure, the molar ratio $Na_2O/Al_2O_3$ should equal one. But if all the excess sodium present in the mother liquor is not washed out of the precipitated product, analysis may show a ratio greater than one, and if the washing is carried too far, some sodium may be ion exchanged by hydrogen, and the ratio will drop below one. It has been found that due to the ease with which hydrogen exchange takes place, the ratio for zeolite X lies in the range of $$(Na_2O/Al_2O_3)=0.9\pm0.2.$$

The ratio for zeolite A lies in the range of $$(Na_2O/Al_2O_3)=1.0\pm0.2.$$

Thus, the formula for zeolite A may be written as follows:

$$1.0\pm0.2Na_2O:Al_2O_3:1.85\pm0.5SiO_2:yH_2O$$

The formula for zeolite X may be written as follows:

$$0.9\pm0.2Na_2O:Al_2O_3:2.5\pm0.5SiO_2:yH_2O$$

"y" may be any value up to 6 for zeolite A; any value up to 8 for zeolite X.

The pores of zeolites normally contain water.

The above formulas represent the chemical analysis of zeolites A and X. When other materials as well as water are in the pores, chemical analysis will show a lower value of y and the presence of other adsorbates. The presence in the crystal lattice of materials volatile at temperatures below about 600° C. does not significantly alter the usefulness of the zeolites as an adsorbent since the pores are usually freed of such volatile materials during activation.

Among the ways of identifying zeolites and distinguishing them from other zeolites and other crystalline substances, the X-ray powder diffraction pattern has been found to be a useful tool. In obtaining the X-ray powder diffraction patterns, standard techniques are employed. The radiation is the $K\alpha$ doublet of copper, and a Geiger counter spectrometer with a strip chart pen recorder is used. The peak heights, I, and the positions as a function of $2\theta$ where $\theta$ is the Bragg angle, were read from a spectrometer chart. From these, the relative intensities, $100\ I/I_o$, where $I_o$ is the intensity of the strongest line or peak, and d the interplanar spacing in Å corresponding to the recorded lines were calculated.

X-ray powder diffraction data for sodium zeolite X are given in Table A. $100\ I/I_o$ and the d values in angstroms (Å) for the observed lines for zeolite X are also given. The X-ray patterns indicate a cubic unit cell of dimensions between 24.5 Å and 25.5 Å. In a separate column are listed the sum of the squares of the Miller indices $(h^2+k^2+l^2)$ for a cubic unit cell that corresponds to the observed lines in the x-ray diffraction patterns. The $a_o$ value for zeolite X is 24.99 Å where $a_o$ is the unit cell edge.

Zeolite X is a name given to a synthetic zeolite having the crystal structure of the naturally occurring mineral, faujasite. Zeolite X is the name for those compounds having an $SiO_2/Al_2O_3$ ratio of less than 3.

TABLE A

| X-RAY DIFFRACTION PATTERN FOR ZEOLITE X | | |
|---|---|---|
| $h^2+k^2+l^2$ | $\dfrac{100\ I}{I_o}$ | d (Å) |
| 3 | 100 | 14.47 |
| 8 | 18 | 8.85 |

TABLE A-continued
X-RAY DIFFRACTION PATTERN FOR ZEOLITE X

| $h^2 + k^2 + l^2$ | $\frac{100\ I}{I_o}$ | d (Å) |
|---|---|---|
| 11 | 12 | 7.54 |
| 19 | 18 | 5.73 |
| 27 | 5 | 4.81 |
| 32 | 9 | 4.42 |
| 35 | 1 | 4.23 |
| 40 | 4 | 3.946 |
| 43 | 21 | 3.808 |
| 44 | 3 | 3.765 |
| 48 | 1 | 3.609 |
| 51 | 1 | 3.500 |
| 56 | 18 | 3.338 |
| 59 | 1 | 3.253 |
| 67 | 4 | 3.051 |
| 72 | 9 | 2.944 |
| 75 | 19 | 2.885 |
| 80 | 8 | 2.794 |
| 83 | 2 | 2.743 |
| 88 | 8 | 2.663 |
| 91 | 3 | 2.620 |
| 96 | 1 | 2.550 |
| 108 | 5 | 2.404 |
| 123 | 1 | 2.254 |
| 128 | 3 | 2.209 |
| 131 | 3 | 2.182 |
| 136 | 2 | 2.141 |
| 139 | 2 | 2.120 |
| 144 | 1 | 2.083 |
| 164 | 1 | 1.952 |
| 168 | 1 | 1.928 |
| 184 | 1 | 1.842 |
| 195 | 1 | 1.789 |
| 200 | 2 | 1.767 |
| 211 | 3 | 1.721 |
| 243 | 3 | 1.603 |

The more significant d values for zeolite X are given in Table B.

TABLE B
MOST SIGNIFICANT d VALUES FOR ZEOLITE X

| d Value of Reflection in Å |
|---|
| 14.42 ± 0.2 |
| 8.82 ± 0.1 |
| 4.41 ± 0.05 |
| 3.80 ± 0.05 |
| 3.33 ± 0.05 |
| 2.88 ± 0.05 |
| 2.79 ± 0.05 |
| 2.66 ± 0.05 |

X-ray powder diffraction data for sodium zeolite A are given in Table C.

TABLE C
X-RAY DIFFRACTION PATTERN FOR ZEOLITE A

| $h^2 + k^2 + l^2$ | d (Å) | $\frac{100\ I}{I_o}$ |
|---|---|---|
| 1 | 12.29 | 100 |
| 2 | 8.71 | 70 |
| 3 | 7.11 | 35 |
| 4 | 6.15 | 2 |
| 5 | 5.51 | 25 |
| 6 | 5.03 | 2 |
| 8 | 4.36 | 6 |
| 9 | 4.107 | 35 |
| 10 | 3.895 | 2 |
| 11 | 3.714 | 50 |
| 13 | 3.417 | 16 |
| 14 | 3.293 | 45 |
| 16 | 3.078 | 2 |
| 17 | 2.987 | 55 |
| 18 | 2.904 | 10 |
| 20 | 2.754 | 12 |
| 21 | 2.688 | 4 |
| 22 | 2.626 | 20 |
| 24 | 2.515 | 6 |
| 25 | 2.464 | 4 |
| 26 | 2.414 | >1 |
| 27 | 2.371 | 3 |
| 29 | 2.289 | 1 |
| 30 | 2.249 | 3 |
| 32 | 2.177 | 7 |
| 33 | 2.144 | 10 |
| 34 | 2.113 | 3 |
| 35 | 2.083 | 4 |
| 36 | 2.053 | 9 |
| 41 | 1.924 | 7 |
| 42 | 1.901 | 4 |
| 44 | 1.858 | 2 |
| 45 | 1.837 | 3 |
| 49 | 1.759 | 2 |
| 50 | 1.743 | 13 |
| 53 | 1.692 | 6 |
| 54 | 1.676 | 2 |
| 55 | 1.661 | 2 |
| 57 | 1.632 | 4 |
| 59 | 1.604 | 6 |

The more significant d values for zeolite A are given in Table D.

TABLE D
MOST SIGNIFICANT d VALUES FOR ZEOLITE A

| d Value of Reflection in Å |
|---|
| 12.2 ± 0.02 |
| 8.7 ± 0.2 |
| 7.10 ± 0.15 |
| 5.50 ± 0.10 |
| 4.10 ± 0.10 |
| 3.70 ± 0.10 |
| 3.40 ± 0.06 |
| 3.29 ± 0.05 |
| 2.98 ± 0.05 |
| 2.62 ± 0.05 |

Occasionally, additional lines not belonging to the pattern for the zeolite appear in a pattern along with the X-ray lines characteristic of that zeolite. This is an indication that one or more additional crystalline materials are mixed with the zeolite in the sample being tested. Frequently these additional materials can be identified as initial reactants in the synthesis of the zeolite, or as other crystalline substances. When the zeolite is heat treated at temperatures of between 100° C. and 600° C. in the presence of water vapor or other gases or vapors, the relative intensities of the lines in the X-ray pattern may be appreciably changed from those existing in the unactivated zeolite patterns. Small changes in line positions may also occur under these conditions. These changes in no way hinder the identification of these X-ray patterns as belonging to the zeolite.

The particular X-ray technique and/or apparatus employed, the humidity, the temperature, the orientation of the powder crystals and other variables, all of which are well known and understood to those skilled in the art of X-ray crystallography or diffraction can cause some variations in the intensities and positions of the lines. These changes, even in those few instances where they become large, pose no problem to the skilled X-ray crystallographer in establishing identities. Thus, the X-ray data given herein to identify the lattice for a zeolite are not to exclude those materials which, due to some variable mentioned or otherwise known to those skilled in the art, fail to show all of the lines, or show a few extra ones that are permissible in the cubic system of that zeolite, or show a slight shift in position of the lines, so as to give a slightly larger or smaller lattice parameter.

A simple test described in "American Mineralogist," Vol. 28, page 545, 1943, permits a quick check of the silicon to aluminum ratio of the zeolite. According to the description of the test, zeolite minerals with a three-dimensional network that contains aluminum and silicon atoms in an atomic ratio of $Al/Si = 2/3 = 0.67$, or greater, produce a gel when treated with hydrochloric acid. Zeolites having smaller aluminum to silicon ratios disintegrate in the presence of hydrochloric acid and precipitate silica.

U.S. Pat. No. 2,882,243 describes a process for making zeolite A comprising preparing a sodium-aluminum-silicate water mixture having an $SiO_2/Al_2O_3$ mole ratio of from 0.5:1 to 2.5:1, an $Na_2O/SiO_2$ mole ratio of from 0.8:1 to 3:1, and an $H_2O/Na_2O$ mole ratio of from 35:1 to 200:1, maintaining the mixture at a temperature of from 20° C. to 175° C. until zeolite A is formed, and separating the zeolite A from the mother liquor.

U.S. Pat. No. 2,882,244 describes a process for making zeolite X comprising preparing a sodium-aluminum-silicate water mixture having an $SiO_2/Al_2O_3$ mole ratio of from 3:1 to 5:1, an $Na_2O/SiO_2$ mole ratio of from 1.2:1 to 1.5:1, and an $H_2O/Na_2O$ mole ratio of from 35:1 to 60:1, maintaining the mixture at a temperature of from 20° C. to 120° C. until zeolite X is formed and separating the zeolite X from the mother liquor.

The process described in U.S. Pat. No. 3,101,251 is similar to that described in U.S. Pat. No. 2,882,243 and 2,882,244, except that the reaction mixture contains an admixture of non-kaolinitic alumino-silicate mineral and sodium hydroxide that has been fused at a temperature of between 330° C. and 370° C.

In U.S. Pat. No. 3,119,659, a kaolin clay and sodium hydroxide are formed into a compact body, dried, reacted in an aqueous mixture at a temperature of from 20° C. to 175° C. until a zeolite is formed. Zeolite A is formed in a reaction mixture having an $Na_2O/SiO_2$ molar ratio of 0.5:1 to 1.5:1, an $SiO_2/Al_2O_3$ molar ratio of 1.6:1 to 2.4:1 and an $H_2O/Na_2O$ molar ratio of 20:1 to 100:1. Zeolite X is formed in a reaction mixture having an $Na_2O/SiO_2$ molar ratio of 1.5:1, an $SiO_2/Al_2O_3$ molar ratio of 5:1, and an $H_2O/Na_2O$ molar ratio of 30:1 to 60:1.

U.S. Pat. No. 4,235,856 discloses a process for making a combination of zeolite X and zeolite A wherein a sodium aluminate solution is added to a sodium silicate solution to form a mixture, then heating and reacting the mixture to 80°-120° C. until the combination zeolite is formed.

Another patent which discloses a process for making synthetic zeolite particles having two different sized effective pore entrance diameters within a single particle, namely a particle containing both a Type A zeolite structure and a Type X zeolite structure is U.S. Pat. No. 3,366,578.

U.S. Pat. No. 4,094,778 discloses a process for sequestering calcium and magnesium cations using mixtures of zeolite A and zeolite X.

British Pat. No. 1,533,496 sets forth a process for preparing low silica faujasite-type zeolites by adding potassium hydroxide or a potassium salt to the alumina trihydrate in addition to the sodium hydroxide prior to the addition of the sodium silicate.

U.S. Pat. No. 4,166,099 discloses a method for preparing crystalline aluminosilicates, such as a Type X synthetic faujasite by seeding an alkaline precursor mixture of alumina and silica with small size zeolite seeds having an average particle size below about 0.1 micron.

Zeolites are useful as molecular sieves and as sequestering agents for calcium and magnesium cations. They are particularly useful in detergent or washing compositions.

It is a primary object of the present invention to provide a faster and more economical process for making combination zeolite X and zeolite A particles.

SUMMARY OF THE INVENTION

The present invention relates to a method of simultaneously producing or co-synthesizing a combination of zeolite X and zeolite A. A sodium aluminate solution and a sodium silicate solution are separately prepared. These solutions are then reacted in the presence of a small amount of zeolite X seed under controlled conditions of temperature and time to form a product which is a combination of zeolite X and zeolite A which is about 40 to 60 percent crystalline with the remainder being substantially an amorphous functional binder.

DESCRIPTION OF THE PREFERRED EMBODIMENTS

In general, solutions of sodium aluminate and sodium silicate are separately prepared. These solutions are mixed together at a temperature of about 15° C. to about 25° C. in the presence of a small amount of seed zeolite for at least about 10 minutes. As soon as addition has been completed, the mixture is rapidly heated to a temperature of about 85° C. to about 110° C. and stirred at such temperature for about 30 minutes. The mixture is then cooled to a temperature of about 70°-75° C. and cooked or held at such temperature for about three to four hours. The hot product is transferred to a holding container and subsequently filtered out at a temperature of about 65°-75° C. After washing and drying, a product which is a combination of zeolite X and zeolite A is recovered. The product has a crystallinity of about 40 percent to about 60 percent with the remainder being an amorphous functional binder.

A product averaging about 20 percent zeolite A and 22 percent zeolite X has been found to be very satisfactory. Preferably, the product has a calcium exchange capacity (C.E.C.) greater than 295 milligrams of calcium carbonate per gram of zeolite and a magnesium exchange capacity (M.E.C.) greater than 175 milligrams of equivalent calcium carbonate.

The compositions of the sodium aluminate and the sodium silicate may be varied as desired; however, they should be such as to provide a system having the following molar ratio of components:

water to sodium oxide—36:1 to 34:1
sodium oxide to silica—0.9:1 to 1.5:1
silica to alumina—2.8:1 to 3.0:1

The reaction is continued with heating at these ratios until the foregoing desired combination zeolite A and Zeolite X product is formed. The product is filtered by any suitable means, washed, dried and then recovered. For example, a sodium aluminate solution comprising 9.55 percent sodium and 4.48 percent aluminum and a sodium silicate solution of water, sodium hydroxide and sodium silicate having a silica to sodium oxide ratio less than 3.2 have produced excellent yields.

A sodium silicate solution having a silica to sodium oxide molar ratio of about 2.8:1 is especially preferred.

The seed zeolite may be a commercially available zeolite X or a combination of zeolite X and zeolite A or may be product from a previous run of the process of this invention. The latter is sometimes referred to as bulk product. The seed zeolite may be present in an amount of about 1.0 to 10 percent by weight of the total system. Activation of the seed zeolite may be from about one minute to about six hours with about three hours being preferred, and the temperature may be from about 0° C. to about 110° C., with 15° C. to 25° C. being most preferred. Stirring or mixing is conducted from about 200 rpm to about 600 rpm. Activation may be in the sodium silicate alone, a sodium silicate-sodium hydroxide mixture, or a sodium silicate-sodium hydroxide-water mixture. Activation may thus be separately performed or done in situ.

Preferably, the sodium aluminate solution is heated to a temperature of about 90° C. and added to the sodium silicate solution. Such addition is relatively slow with vigorous stirring. The system is then allowed to gel without stirring at ambient temperature for up to about 24 hours. Gelling time may be as little as 15 minutes. Cooking time may be from about 1 hour to about 12 hours.

Having described the basic aspects of the invention, the following examples illustrate specific embodiments thereof.

General Procedure

All reactions were carried out in a 1-liter, 3-necked, round-bottom flask equipped with a Teflon blade stirrer operated by a variable speed electric stirrer. A thermometer was inserted in one neck of the flask. The sodium aluminate was added via a funnel for one minute additions and for longer additions via a syringe pump through the funnel neck which was subsequently equipped with a condenser during heating and cooking periods. The system was cooled with a refrigerated circulating bath and heated with oil bottles on hot plates.

Filtrations were made with medium frit glass filter funnels. The solids were washed by stirring for 1 hour in 500 milliliters of distilled water. The washed solids were again filtered and the wash water combined with the spent liquor. The solids were dried at 115° C. in an oven set to shut off three hours after the solids were placed in the oven. The solids were removed after the oven had cooled to ambient temperature. Samples were ground with a mortar and pestle prior to Calcium Exchange Capacity (CEC) and Magnesium Exchange Capacity (MEC) measurement.

Reagents were commercially available products or prepared in the laboratory. Sodium silicate solution typically contained 9.2 percent sodium and 11.9 percent silicon. One batch of sodium silicate contained 11.0 percent sodium and 12.6% silicon. A typical analysis of sodium aluminate used was 9.8 percent sodium and 5.0 percent aluminum. Commercial sodium hydroxide was used. Zeolite seed was bulk product from previous runs with the initial seed being a commercial zeolite X product, Linde 13X.

The standard recipe contained 0.1676 mole of aluminum oxide ($Al_2O_3$). The amounts of sodium aluminate, sodium hydroxide and water were adjusted to provide a final system composition as follows:

$$4.4Na_2O \cdot Al_2O_3 \cdot 3.0SiO_2 \cdot 150H_2O.$$

In the standard seeded system, 7.0 grams of seed were used.

Procedure except as otherwise noted was as follows:

The sodium silicate, sodium hydroxide, water and seed were stirred overnight with a magnetic stirring bar in a sealed plastic bottle (seed activation period).

The activated seed system was transferred to a reactor and stirred at 500 rpm. The sodium aluminate was added via a syringe pump for a 10 minute mixing period.

A thermometer was placed in the neck of the flask and the stirrer was set at 200 rpm. Heating up to 85° C. was then accomplished which typically required 25 to 40 minutes. In those instances where mixing was conducted at 55° C. the reagents used had been preheated to 65° C. and the heat up period was shortened to 15 to 25 minutes. Heating to 85° C. was followed by a 30 minute cook period.

At the end of the cook period, the 85° C. bath was replaced with a 70° C. bath and stirring was continued. A typical holding period was four hours.

The solids were filtered, washed, filtered again and dried. The above procedure is illustrated in the examples and tables hereinafter.

The compositions of the reactants is set forth in Table I and II.

TABLE I

Composition of Sodium Silicates (SS)

| Sample | Weight Percent Sodium | Weight Percent Silicon |
|---|---|---|
| A | 9.86 | 11.10 |
| B | 9.22 | 11.88 |
| C | 9.38 | 10.75 |
| D | 10.98 | 12.62 |

TABLE II

Composition of Sodium Aluminates (SA)

| Sample | Weight Percent Sodium | Weight Percent Aluminum |
|---|---|---|
| E | 14.30 | 13.51 |
| F | 10.68 | 6.03 |
| G | 9.71 | 5.45 |
| H | 9.59 | 5.24 |
| I | 9.73 | 4.86 |
| J | 9.76 | 4.97 |
| K | 10.32 | 5.14 |

TABLE III

Zeolite A/X Synthesis

| Run | System x:y:z | SA[1] | SS[2] | Mix. Temp. °C. | Added First | Mix. Time | Percent Zeolite A | Percent Zeolite X | Comments[21] |
|---|---|---|---|---|---|---|---|---|---|
| | | | | (Runs 1–30) | | | | | |
| 1 | 4.0:2.2:90.6 | F | A | 55 | SS | 1 | 94 | — | |
| 2 | 4.0:2.5:90.6 | F | A | 55 | SS | 1 | 66 | — | |
| 3 | 4.0:2.5:90.6 | F | A | 55 | SS | 1 | 32 | — | |
| 4 | 4.0:3.0:90.6 | F | A | 55 | SS | 1 | 11 | 8 | |

TABLE III-continued

Zeolite A/X Synthesis

| Run | System x:y:z | SA[1] | SS[2] | Mix. Temp. °C. | Added First | Mix. Time | Percent Zeolite A | Percent Zeolite X | Comments[21] |
|---|---|---|---|---|---|---|---|---|---|
| 5 | 3.5:2.2:90.6 | F | A | 55 | SS | 1 | 86 | — | |
| 6 | 3.5:2.5:90.6 | F | A | 55 | SS | 1 | 10 | — | |
| 7 | 3.5:2.8:90.6 | F | A | 55 | SS | 1 | 35 | 24 | |
| 8 | 3.5:3.0:90.6 | F | A | 55 | SS | 1 | 0 | — | |
| 9 | 4.5:2.2:90.6 | F | A | 55 | SS | 1 | 84 | — | |
| 10 | 4.5:2.8:90.6 | F | A | 55 | SS | 1 | 61 | — | |
| 11 | 2.8:2.2:72.3 | G | A | 55 | SS | 1 | 8 | 9 | Harmotome |
| 12 | 4.5:2.9:90.6 | G | A | 55 | SS | 1 | 39 | 14 | |
| 13 | 3.5:2.8:90.6 | F | A | 55 | SS[3] | 1 | 17 | 0 | Harmotome |
| 14 | 3.6:2.8:90.6[4] | G | D | 55 | SS | 1 | 0 | 0 | Harmotome |
| 15 | 3.5:2.8:90.6 | E | D | 55 | SS | 1 | 0 | 0 | Zeolite P |
| 16 | 3.6:2.8:90.6 | G | C | 55 | SS | 1 | 0 | 0 | Zeolite P |
| 17 | 3.5:2.8:90.6 | G | B | 55 | SS | 1 | 0 | 0 | Zeolite P |
| 18 | 3.5:2.8:90.6 | G | B[5] | 55 | SS | 1 | 0 | 0 | Zeolite P |
| 19 | 4.5:2.8:90.6 | G | D | 55 | SS | 1 | 47 | 7 | |
| 20 | 4.5:2.8:90.6 | G | C | 55 | SS | 1 | 55 | 0 | Trace P |
| 21 | 4.5:2.9:90.6 | G | A | 55 | SS | 1 | 15 | 13 | Trace P or Harmotome |
| 22 | 4.0:2.8:90.6 | G | D | 55 | SS | 1 | 10 | 6 | Harmotome |
| 23 | 4.0:2.8:90.6 | G | C | 55 | SS | 1 | 23 | 9 | Harmotome |
| 24 | 4.0:2.8:90.6 | G | B | 55 | SS | 1 | 17 | 7 | |
| 25 | 4.5:2.8:90.6 | G | B | 55 | SS | 1 | 69 | 0 | Trace Harmotome |
| 26[6] | 4.5:2.9:90.6 | G | A | 55 | SS | 1 | 44 | 0 | |
| 27 | 4.5:2.8:90.6 | H | C | 55 | SS | 1 | 54 | 0 | |
| 28 | 4.5:2.8:90.6 | H | C | 55 | SS | 1[7] | 53 | 0 | |
| 29 | 4.5:2.8:90.6 | H | C | 55 | SS | 10[8] | 64 | 0 | |
| 30 | 4.5:2.8:90.6 | H | C[5] | 55 | SS | 1 | 63 | 0 | |
| | | | | | (Runs 31-60) | | | | |
| 31 | 4.5:2.8:90.6 | H | C[5] | 55 | SA | 1 | 50 | 0 | |
| 32 | 4.5:2.8:90.6 | H | C | 25 | SA | 1 | 33 | 3 | |
| 33 | 4.5:2.8:90.6 | H | C[5] | 25 | SA | 1 | 57 | 0 | |
| 34 | 4.5:2.8:90.6 | H | C | 15 | SA | 1 | 33 | 19 | |
| 35 | 4.5:2.8:100.0 | H | C | 55 | SA | 1 | 58 | 0 | |
| 36 | 4.5:2.8:100.0 | H | C[5] | 55 | SA | 1 | 51 | 4 | Harmotome |
| 37 | 4.5:2.8:90.6 | H | C[5] | 15 | SA | 1 | 49 | 7 | |
| 38 | 4.5:3.0:90.6 | H | C | 55 | SA | 1 | 44 | 2 | |
| 39 | 4.5:3.0:90.6 | H | C[5] | 55 | SA | 1 | 42 | 4 | |
| 40 | 4.5:3.0:100.0 | H | C | 55 | SA | 1 | 29 | 0 | Harmotome |
| 41 | 4.5:3.0:100.0 | H | C[5] | 55 | SA | 1 | 0 | 0 | Harmotome |
| 42 | 4.5:3.0:110.0 | H | C | 55 | SA | 1 | 0 | 0 | Harmotome |
| 43 | 4.5:3.0:90.6 | H | C | 15 | SA | 1[3] | 48 | 0 | |
| 44 | 4.5:3.0:100.0 | I | C | 55 | SA | 1[3] | 36 | 0 | Harmotome |
| 45 | 4.5:3.0:100.0 | I | C | 55 | SA | 1 | 58 | 0 | |
| 46 | 4.5:2.8:90.6 | I | C | 15 | SA | 1 | 57 | 0 | |
| 47 | 4.5:3.0:100.0 | I | C[9] | 55 | SA | 1 | 53 | 15 | Harmotome |
| 48 | 4.5:3.0:100.0 | I | C[9] | 25 | SA | 1 | 25 | 24 | Harmotome |
| 49 | 4.5:3.0:100.0 | I | C[10] | 55 | SA | 1 | 43 | 0 | |
| 50 | 4.5:3.0:100.0 | I | C[10] | 15 | SA | 1 | 36 | 5 | |
| 51 | 4.5:3.0:100.0 | I | C[11] | 55 | SA | 1 | 32 | 0 | |
| 52 | 4.5:3.0:100.0 | I | C[11] | 25 | SA | 1 | 36 | 4 | |
| 53 | 4.5:3.0:100.0 | I | C[9] | 15 | SA | 1 | 31 | 17 | Harmotome |
| 54 | 4.5:3.0:100.0 | I | C[9] | 25 | SA | 11 | 32 | 25 | Harmotome |
| 55 | 4.5:3.0:100.0 | I | C[9] | 25 | SA | 1 | 23 | 15 | Harmotome |
| 56 | 4.5:3.0:100.0 | I | C[9] | 25 | SA | 1 | 22 | 25 | Harmotome |
| 57 | 4.5:3.0:100.0 | I | C[9] | 15 | SA | 10 | 28 | 26 | Harmotome |
| 58 | 4.5:3.0:100.0 | I | C[9] | 25 | SA | 10 | 26 | 27 | Trace Harmotome |
| 59 | 4.5:3.0:100.0 | J | C[9] | 25 | SA | 1 | 31 | 22 | Harmotome |
| 60 | 4.5:3.0:100.0 | J | B[9] | 15 | SA | 10 | 31 | 20 | Harmotome |
| | | | | | (Runs 61-90) | | | | |
| 61 | 4.5:3.0:100.0 | J | B[9] | 25 | SA | 10 | 25 | 25 | Harmotome |
| 62 | 4.5:3.0:100.0 | J | C[9] | 25 | SA | 22 | 34 | 23 | Harmotome |
| 63 | 4.5:3.0:100.0 | J | A[9] | 15 | SA | 10 | 20 | 19 | Harmotome |
| 64 | 4.5:3.0:100.0 | J | A[9] | 25 | SA | 10 | 26 | 27 | Harmotome |
| 65 | 4.5:3.0:100.0 | J | C[9] | 24 | SA | 10 | 37 | 22 | Harmotome |
| 66 | 4.5:3.0:100.0 | J | C[9] | 25 | SA | 10[12] | 26 | 27 | Harmotome |
| 67 | 4.5:3.0:100.0 | J | C[9] | 55 | SA | 10 | 30 | 20 | Harmotome |
| 68 | 4.5:3.0:100.0 | J | C[9] | 55 | SA | 10 | 41 | 16 | Harmotome |
| 69 | 4.5:3.0:100.0 | J | C[9] | 25 | SA | 10[13] | 23 | 25 | Harmotome |
| 70 | 4.5:3.0:100.0 | J | C[9] | 25 | SA | 10[14] | 25 | 17 | Harmotome |
| 71 | 4.5:3.2:100.0 | J | C[9] | 25 | SA | 10 | 22 | 29 | Harmotome |
| 72 | 4.5:3.2:100.0 | J | C[9] | 25 | SA | 10 | 16 | 25 | Harmotome |
| 73 | 4.5:3.2:100.0 | J | C[9] | 25 | SA | 10 | 19 | 24 | Harmotome |
| 74 | 4.4:3.0:100.0 | J | C[9] | 25 | SA | 10 | 18 | 25 | Harmotome |
| 75 | 4.4:3.2:100.0 | J | C[9] | 25 | SA | 10 | 22 | 23 | Harmotome |
| 76 | 4.5:3.2:100.0 | J | C[9] | 25 | SA | 10 | 15 | 22 | Harmotome |
| 77 | 4.4:3.2:100.0 | K | C[9] | 25 | SA | 10 | 16 | 32 | Zeolite P |
| 78 | 4.5:3.0:100.0 | K | C[9] | 25 | SA | 10 | 17 | 33 | |
| 79 | 4.6:3.0:100.0 | K | C[9] | 25 | SA | 10 | 32 | 26 | |

TABLE III-continued

| | | | | Zeolite A/X Synthesis | | | | |
|---|---|---|---|---|---|---|---|---|
| Run | System x:y:z | SA[1] | SS[2] | Mix. Temp. °C. | Added First | Mix. Time | Percent Zeolite A | Percent Zeolite X | Comments[21] |
| 80 | 4.4:3.2:120.0 | K | C[9] | 25 | SA | 10 | 10 | 31 | Harmotome |
| 81 | 4.5:3.2:110.0 | K | C[9] | 25 | SA | 10 | 9 | 42 | Zeolite P |
| 82 | 4.4:3.2:110.0 | K | C | 25 | SA | 10 | 11 | 31 | Zeolite P |
| 83 | 4.5:3.0:100.0 | K | C[15] | 25 | SA | 10 | 40 | 0 | |
| 84 | 4.5:3.0:100.0 | K | C[18] | 25 | SA | 10 | 39 | 12 | Harmotome |
| 85 | 4.5:3.0:100.0 | K | C[16] | 25 | SA | 10 | 39 | 9 | |
| 86 | 4.5:3.0:100.0 | K | C[19] | 25 | SA | 10 | 38 | 5 | Harmotome |
| 87 | 4.5:3.0:100.0 | K | C[17] | 25 | SA | 10 | 36 | 10 | Harmotome |
| 88 | 4.5:3.0:100.0 | K | C[20] | 25 | SA | 10 | 28 | 0 | Zeolite P |
| 89 | 4.6:3.0:100.0 | K | C[9] | 25 | SA | 10 | 34 | 21 | |
| 90 | 4.5:3.2:110.0 | K | C[9] | 25 | SA | 10 | 18 | 39 | Zeolite P |

(NOTES) ZEOLITE A/X SYSTEM
[1] SA = Sodium Aluminate
[2] SS = Centrifuged Sodium Silicate
[3] Cook Time = ¾ hour
[4] $Na_2O/Al_2O_3$ ratio charge forced by feed composition charges
[5] 5% Linde 13X seed added
[6] Repeat of Run 12
[7] Heated SS + $H_2O$ for 6 hours at 65° C. prior to use
[8] Mix 1 minute, hold 9 minutes prior to heating
[9] 10% Linde 13X seed
[10] 10% Run 34 seed
[11] 10% Run 7 seed
[12] 1 hour cook; 3½ hours hold
[13] 2 hours cook; 2½ hours hold
[14] 4 hours cook; no hold
[15] 10% Run 54 seed
[16] 10% Run 57 seed
[17] 10% Run 67 seed
[18] 20% Run 54 seed
[19] 20% Run 57 seed
[20] 20% Run 67 seed
[21] Harmotome and Zeolite P are reported. These two zeolites cannot be distinguished in the region normally scanned by X-Ray Diffraction (XRD) to determine zeolite X and zeolite A content. Either or both may be present in any particular run where an impurity is listed.
A. Runs 1-46 represent those runs in which there was either no seeding or low level seeding. These conditions were not conducive to the formation of zeolite X.

EXAMPLE 1

A sodium alumino silicate system of 4.5 $Na_2O.Al_2O_3.3.0SiO_2.100.0H_2O$ was prepared. 131.4 grams of centrifuged sodium silicate (9.38 weight percent sodium and 10.75 weight percent silica), 7.3 grams of sodium hydroxide, 70.8 grams of water and 7.0 grams of Linde 13X seed were placed in a plastic bottle with a magnetic stirring bar and slowly stirred overnight. The fluid system was then transferred to a reactor and over a 10 minute period 186.2 grams of sodium aluminate (9.73 weight percent sodium and 4.86 weight percent aluminum) were added using a Sage syringe pump set at 200×1 and 60 milliliter plastic syringes. During this time the system was stirred at 500 rpm. Stirring was reduced to 200 rpm and a thermometer installed to seal the system. The system was then tested with an oil bath for 28 minutes to 85° C. The temperature was maintained for 30 minutes after which the 85° C. bath was replaced with a 70° C. bath and stirring continued. After four hours, the unit was shut down, the slurry filtered, the solids washed, refiltered and dried. The solids were then ground using three passes through a bench scale hammer mill. The zeolite A-X product weighed 77.9 grams. (Run 54 of Table III)

EXAMPLE 2

A sodium alumino silicate system of 4.5 $Na_2O.Al_2O_3.3.2SiO_2.110.0H_2O$ was prepared. 140.2 grams of centrifuged sodium silicate (9.38 weight percent sodium and 10.75 weight percent aluminum 1, 4.8 grams of sodium hydroxide, 106.0 grams of water, and 7.0 grams of Linde 13X seed were stirred as in Example 1 for 8 hours. After standing for seven hours, the system was heated to 65° C. After one hour, the mixing procedure of Example 1 was continued using 176.1 grams of sodium aluminate (10.32 weight percent silicon and 5.14 weight percent aluminum) preheated to 65° C. was used. The average temperature of the mixing system was near 55° C. Heat up in this system required about 23 minutes. The procedure of Example 1 was continued. The zeolite A-X product weighed 78.1 grams. (Run 90 of Table III)

EXAMPLE 3

A sodium alumino silicate system of 4.5 $Na_2O.Al_2O_3.3.0SiO_2.100H_2O$ was prepared. Example 1 was repeated except that the reagents were cooled to 15° C. prior to use and the mixing system was maintained at 15° C. during mixing. Heat up required 38 minutes. The zeolite A-X product weighed 81.0 grams. (Run 47 of Table III)

The significant results of all runs are summarized in Table III as well as any experimental variables. The average amount of product was 78.1 grams±2.1 grams. The system is conveniently identified as follows:

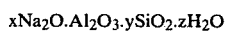
$xNa_2O.Al_2O_3.ySiO_2.zH_2O$ with numerical values for integer x, y and z shown for each run.

A typical composition for bulk seeded product is that of Run 90, namely,

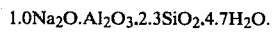
$1.0Na_2O.Al_2O_3.2.3SiO_2.4.7H_2O.$

Values obtained for CEC and MEC are shown in Table IV along with water content.

TABLE IV

| Run | CEC | MEC | Percent water |
|---|---|---|---|
| 67 | 287 | 138 | 21.44 |
| 90 | 272 | 177 | 21.27 |
| 54 | 295 | 174 | 22.79 |
| 65 | 309 | 170 | 22.91 |
| 85 | 295 | 177 | 21.62 |
| 57 | 306 | 177 | 24.87 |

Coulter counter particle size distribution for Run 54 is set forth in Table V hereinafter. The mean particle size was 3.0 microns.

TABLE V

| Micron | Percent Greater Than |
|---|---|
| 1.0 | 100 |
| 1.3 | 100 |
| 1.6 | 93 |
| 2.0 | 81 |
| 2.6 | 69 |
| 3.2 | 58 |
| 4.0 | 48 |
| 5.1 | 39 |
| 6.3 | 30 |
| 8.0 | 24 |
| 10.0 | 21 |
| 12.8 | 17 |
| 16.0 | 15 |
| 20.0 | 10 |
| 25.0 | 6 |
| 32.0 | 3 |

From the experiments in Table III, it is seen that within each series, at constant $Na_2O/Al_2O_3$ ratio, increasing $SiO_2/Al_2O_3$ ratio resulted in decreasing of the zeolite A content and unexpectedly some self-nucleated zeolite X in some cases at the higher ratios. This latter phenomenon had not previously been observed. From the results, it can be concluded that the optimum ratios for producing the desired amount of Zeolite A, and that are in a region where Zeolite X can reasonably be expected to be seeded are as follows:

$Na_2O/Al_2O_3$—about 4.5
$SiO_2/Al_2O_3$—about 3.0
$H_2O/Al_2O_3$—about 100.0

Self-nucleation of Zeolite X, i.e. without seeding, was observed in ten runs, the most notable one being Run 7, but with relatively large amounts in both Run 34 and Run 12. In the seven other examples the quantity of Zeolite X found was less than 10 weight percent. In all but Run 11, the high $SiO_2/Al_2O_3$ ratios were reasonably favorable to the formation of Zeolite X.

From Runs 47 on, seeding was at a relatively high level. About 9 weight percent of the final product was from the seed initially present.

A "standard" set of conditions has been defined as a composition of 4.5 $Na_2O.Al_2O_3.3.0SiO_2.100.0H_2O$ mixed by addition of sodium aluminate (SA) to a mixture of activated Linde 13X (at a 9 weight percent level based on the weight of expected product), sodium silicate (SS), caustic (NaOH), and water at 25° C. in a 10 minute mix, followed by a 30 minute cook period and a four hour bath. The effects of various changes when compared with the "standard" system are shown in Table VI hereinafter.

TABLE VI

| SS = C of Table I and SA = I of Table II | A | X |
|---|---|---|
| 55° C. mix | I | L |
| 15° C. mix | — | L |
| 1 minute mixing time | L | — |
| Cook period 1 hour or longer | — | — |
| Change SS to B of Table I | — | — |
| Change SS to A of Table I | — | — |
| Change SA to J of Table II | — | — |
| Change $SiO_2/Al_2O_3$ to 3.2 | L | — |
| Change $H_2O/Al_2O_3$ to 110.0 | L | — |
| Change $Na_2O/Al_2O_3$ to 4.4 | L | — |
| Change $Na_2O/Al_2O_3$ to 4.4 and $SiO_2/Al_2O_3$ to 3.2 | — | — |
| Change $H_2O/Al_2O_3$ to 120.0, $Na_2O/Al_2O_3$ to 4.4, $SiO_2/Al_2O_3$ to 3.2 | L | I |
| Change SA to K of Table II | L* | I |
| Change $Na_2O/Al_2O_3$ to 4.6 | L* | — |
| Change $SiO_2/Al_2O_3$ to 3.2 and $H_2O/Al_2O_3$ to 110.0 | L | I |
| Change to bulk seed | I | L* |
| Mix 55° C., $Na_2O/Al_2O_3$ = 4.6 | L* | — |

I = Improve
L = Lower
— = No effect
*indicates probable but not statistically demonstrated.

From three separate aliquots and of one sample, a typical Zeolite A-X product was measured. The results are set forth in Table VII.

TABLE VII

| d (Angstroms) | I/Io |
|---|---|
| 14.42 ± 0.02 | 100 |
| 12.23 ± 0.03 | 18 |
| 8.70 ± 0.02 | 52 |
| 7.50 ± 0.05 | 14 |
| 7.10 ± 0.01 | 41 |
| 5.73 ± 0.01 | 21 |
| 5.47 ± 0.04 | 6 |
| 5.05 ± 0.05 | 17 |
| 4.41 ± 0.01 | 9 |
| 4.10 ± 0.00 | 54 |
| 3.81 ± 0.00 | 40 |
| 3.70 ± 0.00 | 23 |
| 3.39 ± 0.01 | 20 |
| 3.34 ± 0.01 | 27 |
| 3.28 ± 0.01 | 9 |
| 3.17 ± 0.00 | 49 |
| 3.05 ± 0.01 | 6 |
| 2.97 ± 0.01 | 34 |
| 2.89 ± 0.01 | 22 |
| 2.75 ± 0.04 | 3 |
| 2.69 ± 0.01 | 44 |

Not wishing to be bound by any particular theory, it is believed that there is a competition between seed induced growth of zeolite X and self-nucleation of zeolite A. If the temperature is lowered, the growth of zeolite X is favored at the expense of zeolite A and, conversely, if the temperature is increased, one rapidly enters a region where zeolite X will not grow on the seed.

The primary product upon completion of mixing is amorphous material, that is, the nuclei which may be crystalline consists of crystals too small to give an X-ray diffraction response. During the heat-up, cook and hold periods, material is transferred from the amorphous phase to the crystalline phases. This process is slow and requires at least ¾ hour at cook temperature to insure a crystalline product. Considerably more time is required to make acceptable CEC and MEC product.

After a sufficient cook period to insure a crystalline product, the remainder of the time requirement is met with unstirred hold at 70° C. Seed activation by contact with fresh sodium silicate for a period of time may be required when using dry seed.

Mixing temperature is very important. Acceptable crystallinities can be achieved at higher mixing temperatures, but the magnesium exchange capacity suffers.

Reducing the cycle time decreases CEC and MEC.

The foregoing disclosure and description of the invention are illustrative and explanatory thereof, and various changes in the illustrated process may be made within the scope of the appended claims without departing from the spirit of the invention.

What is claimed is:

1. A method of co-synthesizing zeolite A and zeolite X, comprising adding a sodium aluminate solution to a sodium silicate solution activated with a relatively small amount of bulk or seed zeolite X amount of zeolite X, mixing the resultant solution for at least ten minutes at a temperature of about 15° C. to 25° C., then heating the mixture to a temperature of about 85° C. to 110° C. to form a product which is a combination of zeolite A and zeolite X particles of about 40 percent to 60 percent crystalline with the balance being an amorphous functional binder.

2. The method of claim 1, wherein the product averages about 20 percent zeolite A and 22 percent zeolite X.

3. The method of claim 1, wherein the water to sodium oxide ratio is from about 34:1 to about 36:1.

4. The method of claim 1, wherein the product of claim 1 has a calcium exchange capacity greater than 295 mg of calcium carbonate per gram of zeolite and a magnesium exchange capacity greater than 175 mg of equivalent calcium carbonate.

5. A method for producing a combination of zeolite A and zeolite X by the reaction of sodium aluminate and sodium silicate characterized by the following steps:
   (a) forming an aqueous solution of sodium aluminate;
   (b) forming an aqueous solution of sodium silicate;
   (c) adding the sodium aluminate solution to the sodium silicate solution in the presence of a relatively small amount or seed amount zeolite X, cooling to a temperature of about 15° C. to 25° C. and mixing together for at least ten minutes to produce a reaction mixture comprising a sodium silicate mother liquor and an amorphous sodium alumina silicate;
   (d) heating mixture to a temperature of about 85° C. to 110° C., the reaction mixture having the following molar ratios of components:
      (i) water to sodium oxide—36.6:1 to 34.1:1,
      (ii) sodium oxide to silica—0.9:1 to 1.5:1,
      (iii) silica to alumina—2.8:1 to 3.0:1;
   (e) heating and continuing the reaction at these molar ratios until a combination of zeolite A and zeolite X is formed while controlling the molar ratios and reaction time to produce a fine particle size combination zeolite A and zeolite X of about 40 percent crystallinity with the remainder being an amorphous functional binder;
   (f) recovering the combination zeolite A and zeolite X.

6. The method of claim 5, wherein the amount of zeolite X seed is from about 0.1 to about 10.0 percent by weight of the total system.

7. The method of claim 5, wherein the zeolite X seed is activated by stirring in the sodium silicate for about one minute to about six hours.

8. The method of claim 5, wherein after heating the combination zeolite A and zeolite X is filtered, washed and dried and then recovered.

9. The method of claim 5, wherein the silica to sodium oxide ratio of the sodium silicate is less than 3.2.

10. A method of producing a combination of zeolite X and zeolite A, comprising the steps of:
    (a) forming a sodium aluminate solution;
    (b) forming a sodium silicate solution, comprising sodium silicate, sodium hydroxide and water;
    (c) adding a relatively small amount or seed amount zeolite X to the sodium silicate solution and then stirring for a sufficient period of time up to about six hours to activate the sodium silicate system at a temperature from about 15° C. to about 25° C.;
    (d) adding the sodium aluminate solution to the sodium silicate solution to produce a reaction mixture of sodium silicate mother liquor, zeolite seed and an amorphous sodium alumino silicate having in total the following molar ratios:
       (i) sodium oxide to silica—0.9:1 to 1.5:1,
       (ii) silica to alumina—2.8:1 to 3.0:1,
       (iii) water to sodium oxide—36.6:1 to 34.1:1;
    (e) mixing the solution together for at least about ten minutes and reacting the mixture at a temperature of about 85° C. to about 110° C.; and
    (f) recovering the combination of zeolite X and zeolite A, having a crystallinity of about 40 percent to 60 percent with the remainder being an amorphous functional binder.

11. The method of claim 10, wherein the sodium silicate solution has a silica to sodium oxide molar ratio of about 2.8:1.

12. The method of claim 10, wherein the sodium aluminate solution is heated to a temperature of about 90° C.

13. The method of claim 10, wherein after activation the sodium silicate system is heated to a temperature of about 90° C.

14. The method of claim 10, wherein the mixture is reacted at a temperature of about 90° C.

15. The method of claim 10, wherein the product formed averages about 20 percent zeolite A and 22 percent zeolite X.

16. The method of claim 10, wherein the water to sodium oxide molar ratio is 36.6:1.

17. The method of claim 10, wherein the stirring in step (c) is conducted for a period of about three hours.

18. The method of claim 10, wherein the stirring of step (c) is conducted from about 200 rpm to about 600 rpm.

19. The method of claim 10, wherein the sodium silicate solution is formed by dissolving sand in a sodium hydroxide solution at sufficient pressure and temperature to produce a sodium silicate solution having a silica to sodium oxide molar ratio of between 2.4:1 and 2.8:1 and then activated with about 500 ppm alumina at ambient temperature.

20. The method of claim 10, wherein the amount of zeolite X seed is from about 0.1 to about 10.0 percent of the total system.

21. The method of claim 10, wherein the zeolite X seed is activated in sodium silicate having a silica to sodium oxide ratio less than 3.2.

* * * * *

UNITED STATES PATENT AND TRADEMARK OFFICE
CERTIFICATE OF CORRECTION

PATENT NO. : 4,406,822
DATED : September 27, 1983
INVENTOR(S) : ROBERT N. SANDERS and SEBASTIAN M. LAURENT It is certified that error appears in the above-identified patent and that said Letters Patent is hereby corrected as shown below:

Column 1, line 55, reads "zeolite Z", should read --zeolite A--.

Signed and Sealed this

Seventeenth Day of July 1984

[SEAL]

Attest:

Attesting Officer

GERALD J. MOSSINGHOFF
Commissioner of Patents and Trademarks